United States Patent
Wilson et al.

(10) Patent No.: US 7,082,554 B2
(45) Date of Patent: Jul. 25, 2006

(54) SYSTEM AND METHOD FOR PROVIDING ERROR ANALYSIS AND CORRELATION IN A NETWORK ELEMENT

(75) Inventors: Karen Margaret Wilson, Nepean (CA); Andre Poulin, Hull (CA); Jiang Wang, Kanata (CA)

(73) Assignee: Alcatel Canada Inc., Kanata (CA)

( * ) Notice: Subject to any disclaimer, the term of this patent is extended or adjusted under 35 U.S.C. 154(b) by 575 days.

(21) Appl. No.: 10/274,900

(22) Filed: Oct. 22, 2002

(65) Prior Publication Data

US 2003/0145249 A1 Jul. 31, 2003

(30) Foreign Application Priority Data

Jan. 24, 2002 (CA) .................................. 2369351

(51) Int. Cl.
*G06F 11/00* (2006.01)

(52) U.S. Cl. .......................................... 714/43; 714/26

(58) Field of Classification Search ................... 714/43; 370/217, 244

See application file for complete search history.

(56) References Cited

U.S. PATENT DOCUMENTS

| | | | | |
|---|---|---|---|---|
| 5,748,098 A | * | 5/1998 | Grace | 370/242 |
| 5,768,501 A | * | 6/1998 | Lewis | 714/48 |
| 5,771,274 A | * | 6/1998 | Harris | 379/22.03 |
| 5,774,645 A | * | 6/1998 | Beaujard et al. | 714/25 |
| 5,864,662 A | * | 1/1999 | Brownmiller et al. | 714/43 |
| 6,253,339 B1 | * | 6/2001 | Tse et al. | 714/47 |
| 6,680,903 B1 | * | 1/2004 | Moriguchi et al. | 370/216 |
| 6,707,795 B1 | * | 3/2004 | Noorhosseini et al. | 370/242 |
| 6,748,557 B1 | * | 6/2004 | Beardsley et al. | 714/43 |
| 6,775,236 B1 | * | 8/2004 | Scrandis et al. | 370/241 |
| 2001/0056553 A1 | * | 12/2001 | Suzuki et al. | 714/4 |

* cited by examiner

*Primary Examiner*—Scott Baderman
*Assistant Examiner*—Gabriel L. Chu
(74) *Attorney, Agent, or Firm*—Marks & Clerk; Richard J. Mitchell (57) ABSTRACT

The present invention provides method and system for identifying a faulty component in a group of components, the group comprising in a connected configuration at least a first component connected to a second component, and further connected to at least a third component. In an embodiment, the method comprises: (i) monitoring for at least one fault at a component connection interface; and (ii) upon detection of a fault, identifying the faulty component utilising information from the fault and at least one rule for identifying the faulty component. The rules are defined from at least one characteristic of the fault, such as location and frequency, and at least one characteristic of the configuration.

16 Claims, 8 Drawing Sheets

SYSTEM AND METHOD FOR PROVIDING ERROR ANALYSIS AND CORRELATION IN A NETWORK ELEMENT

FIELD OF THE INVENTION

The invention relates generally to a method and system for analysing and correlating errors detected at component interfaces within a network element.

BACKGROUND OF INVENTION

In a communications network, there is a need for providing a high level of service availability for data traffic travelling in the network. Accordingly, for network elements in the communications network, redundant datapaths are provided. If there is a problem with a particular network element, such as a node or a link, the data traffic is re-routed onto an alternate datapath. At the network element level, as the service availability of each node and link may affect the overall service availability of the network, it is necessary to monitor each node and link for faults in order to maintain a high level of service availability for those nodes and links.

For example, a node comprising a routing switch may be monitored for faults so that its service availability can be maintained at a high level. While providing redundant datapaths within the routing switch partially addresses the issue of maintaining high service availability, it is also desirable to be able to isolate a fault, and to repair or replace any faulty components within the routing switch, so that the redundancy built into the routing switch continues to be fully functional.

In the prior art, various solutions have been proposed for isolating errors in a node, such as a routing switch, so that a faulty component or field replaceable unit (FRU) can be identified and replaced. However, in more complex configurations providing multiple fault indications, the source of a fault may be uncertain. This is particularly problematic where the fault indications are at an interface linking a component to one or more other components. While a step-by-step manual test of each component may eventually identify the faulty component through trial and error, the process can be unreliable and time consuming.

Thus, there is a need for a more comprehensive method and system for analysing and correlating errors occurring within a group of components or FRUs, such that identification of the faulty FRU is improved.

SUMMARY OF INVENTION

In a first aspect, a method of identifying a faulty component in a group of components is provided, said group comprising in a connected configuration at least a first component having a first connection interface connected to a second component having a second connection interface, and further connected to at least a third component having a third connection interface.

The method comprises:
i) monitoring for at least one fault at any one of said connection interfaces; and
ii) upon detection of said at least one fault, identifying said faulty component utilising information from said at least one fault and at least one rule for identifying said faulty component, said at least one rule being defined from at least one characteristic of said at least one fault and at least one characteristic of said configuration.

In an embodiment of the first aspect, a first rule of said at least one rule utilises location information associated with said at least one fault as a factor in identifying said faulty component.

In another embodiment, a second rule utilises frequency information associated with said at least one fault as a second factor in identifying said faulty component.

In yet another embodiment, a third rule utilises component redundancy in said configuration as a third factor in identifying said faulty component.

In still another embodiment, said at least one rule for identifying said faulty component utilises a probability value that a particular component of one of said components is said faulty component, and factors of said first, second and third rules are utilised.

In another embodiment, the method further comprises the steps of:
iii) monitoring for changes of state in at least one component of said group; and
iv) utilising in a fourth rule any said changes of state as another factor in identifying said faulty component.

In another embodiment of the first aspect, the method further comprises the step of:
iii) prior to step ii), developing said at least one rule for identifying said faulty component in dependence upon at least one characteristic of a possible fault, and at least one characteristic of said configuration.

In a second aspect, a system for identifying a faulty component in a group of components is provided, said group comprising in a connected configuration at least a first component having a first connection interface connected to a second component having a second connection interface, and further connected to at least a third component having a third connection interface.

The system comprises:
a) at least one monitor for monitoring for at least one fault at any one of said interfaces; and
b) a processor for processing at least one rule for identifying said faulty component, said processor using as an input at least one characteristic of said at least one fault and at least one characteristic of said connected configuration.

In an embodiment of the second aspect, said group includes at least one redundant pair of components, and each component of each said redundant pair is connected to at least one other component.

In another embodiment of the second aspect, said at least one rule processed by said processor utilises location information associated with said at least one fault as a factor in identifying said faulty component.

In still another embodiment of the second aspect, said at least one rule processed by said processor utilises frequency information associated with said at least one fault as another factor in identifying said faulty component.

In yet another embodiment of the second aspect, said at least one rule processed by said processor utilises component redundancy in said group as another factor in identifying said faulty component.

In another aspect, the present invention provides a method of identifying a faulty component in a group of components, said group comprising in a configuration a first set of components connected across an interface region to a second set of components, each component of said first set being connected to each component of said second set, said method comprising:
i) monitoring for at least one fault within said interface region; and ii) upon detection of said at least one fault, identifying said faulty component utilising information from said at least one fault and at least one rule for identifying said faulty component, said at least one rule being defined from at least one characteristic of said at least one fault and at least one characteristic of said configuration.

In still another aspect, the present invention provides a system for identifying a faulty component in a group of components, said group comprising in a configuration a first set of components connected across an interface region to a second set of components, each component of said first set being connected to each component of said second set, said system comprising:

a) at least one monitor for monitoring for at least one fault within said interface region; and b) a processor for processing at least one rule for identifying said faulty component, said processor using as an input at least one characteristic of said at least one fault and at least one characteristic of said configuration.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following acronyms are used in this specification:

| Acronym | Description |
| --- | --- |
| AE | Application Environment-Refers to a software area on a Control Card that encompasses all AM objects and a message server. |
| AM | Application Module-A software module dealing with physical system components such as cards, ports and streams, as well as applications that deal with non-physical components such as alarms and system components. |
| CAM | Card Application Module-An Application Module object residing on a card and used for communicating configuration and status information with the corresponding AM on the Control Card. |
| EAC | Error Analysis and Correlation |
| FIC | Fabric Interface Card |
| FRU | Field Replaceable Unit-A physical entity in a system or node which can be replaced to fix problems or to perform upgrades. |
| HSPS | High Speed Peripheral Shelf |
| IGSM | Interface Group State Machine |
| IOC | I/O Card-An FRU which is attached to a Line Card and connects to communications links including links from other nodes. |
| LC | Line Card |
| LFI | LC/FIC Interface |
| LII | LC/IOC Interface |
| PS | Peripheral Shelf |

The following is an illustrative example of a communications network comprising a plurality of network elements (e.g. a node comprising a routing switch) in which the method and system for error analysis and correlation (EAC) in accordance with an embodiment of the invention may be practised.

Figure 1:
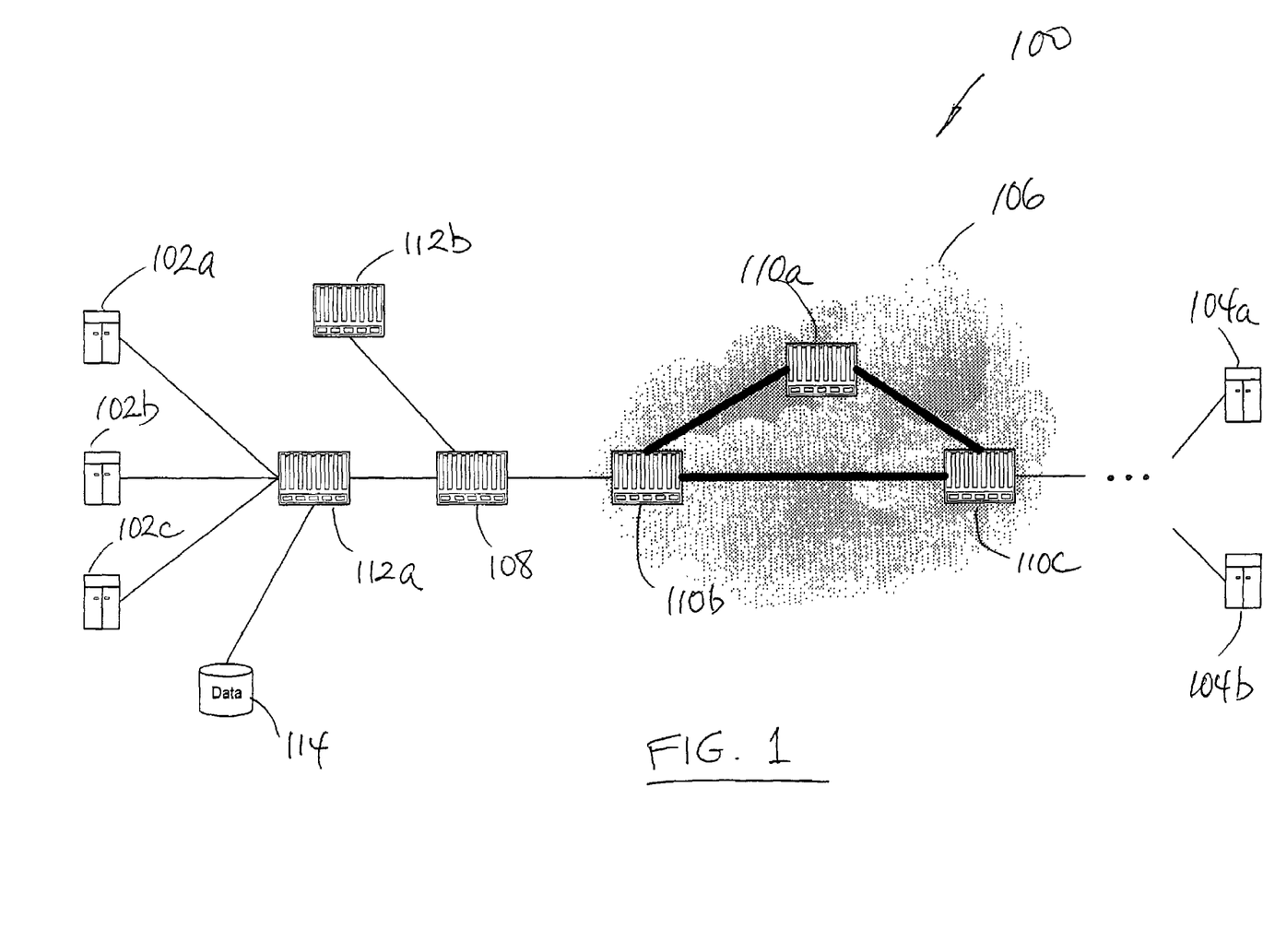
FIG. 1 is a block diagram of a communications network comprising a plurality of network elements, including a node comprising a routing switch.

Referring to FIG. 1, a communication network 100 is shown. Network 100 allows devices (such as customer premises equipment or CPEs) 102a, 102b, and 102c to communicate with other devices 104A and 104B through network cloud 106. CPEs 102a, 102b, 102c may be connected to a node 112a which may have access to data 114 and further connects to an edge node or routing switch 108 at the edge of network cloud 106. The routing switch 108 serves as the connection point for various nodes 112a, 112b for access to network cloud 106.

In network cloud 106, a plurality of switches 110a, 110b and 110c are connected forming the communications backbone of network cloud 106. In turn, connections from network cloud 106 connect to devices 104a and 104b through various other links and switches (not shown).

While a routing switch 108 has been selected as an illustrative example for the purposes of this discussion, it will be appreciated that the teachings of the present invention may be applicable to practically any type of node having error detection capabilities and comprising one or more components or FRUs which can be grouped together for error analysis and correlation, as described in detail further below.

Figure 2A:
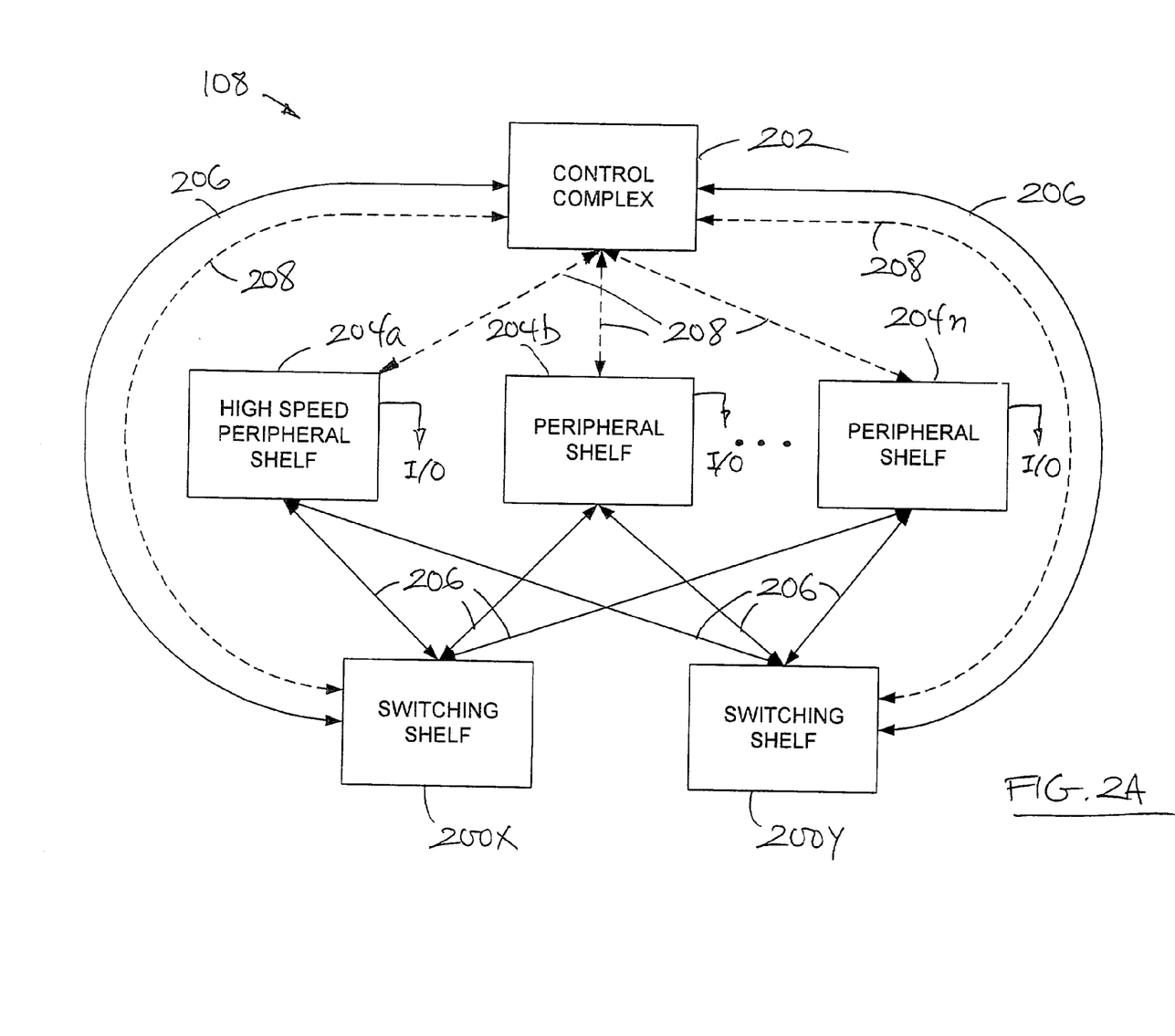
FIG. 2A is a schematic block diagram of various components of the routing switch of FIG. 1.

Referring now to FIG. 2A, details of a node are shown in which routing switch 108 is a multi-protocol routing switch platform capable of connecting and switching multiple communication links. The routing switch 108 allows scaling of the switching capacity by the insertion or removal of shelves and components in the routing switch 108.

Figure 2B:
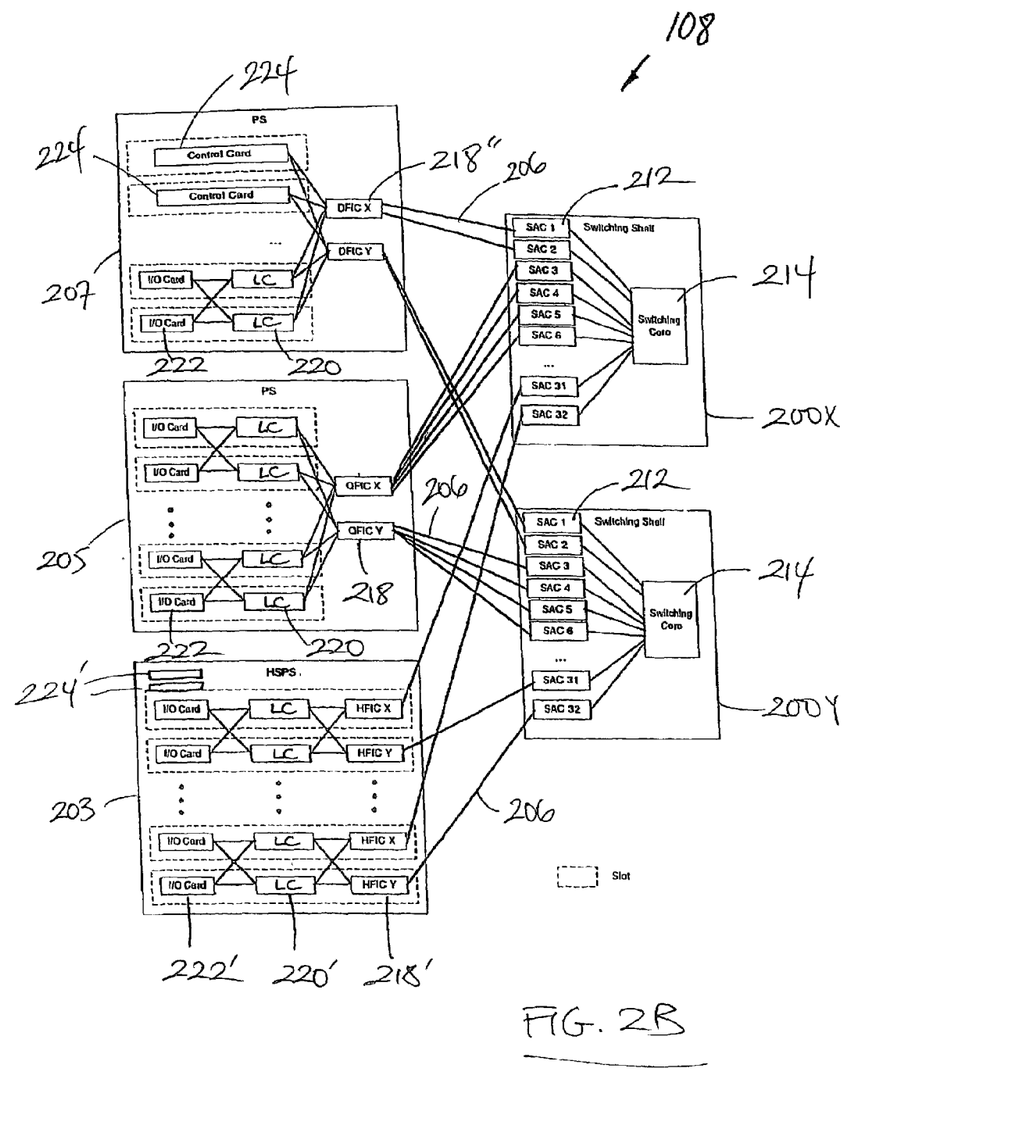
FIG. 2B is a block diagram of a possible layout of various FRUs configured within various shelves of the routing switch of FIG. 1.

As shown in FIG. 2B, and referring back to FIG. 2A, routing switch 108 may comprise, for example, two switching shelves 200X and 200Y, a control complex 202 and various peripheral shelves 203, 205, 207. The control complex 202 may, in an embodiment, be located on shelf 207 and comprises control cards 224 which may provide central management for the routing switch 108.

Switching shelves 200X and 200Y provide data cell switching capacity for routing switch 108. The peripheral shelves 203, 205, 207 provide I/O connectivity for routing switch 108, allowing connection of various types of devices, such as the customer CPEs 102*a*, 102*b*, and 102*c* connected through node 112*a* to routing switch 108 (FIG. 1).

In an embodiment, communication links 206, 208 enable the switching shelves 200X, 200Y, peripheral shelves 203, 205, 207 and control complex 202 to communicate data and status information to each other. High-speed inter-shelf links (HISLs) 206 link the switching shelves 200X, 200Y with the various peripheral shelves 203, 205, 207. Control service links (CSLs) 208 connect control complex 202 with switching shelves 200X and 200Y and with the peripheral shelves 203, 205, 207.

Still referring to FIGS. 2A and 2B, in an embodiment, each switching shelf 200X and 200Y contains a switching fabric core 214 and up to 32 switch access cards (SACs) 212. As shown in FIG. 2B, each FIC 218, 218', 218" on the peripheral shelves 205, 203, 207 communicates with the switching core 214 through the SACs 212.

For illustrative purposes, two types of peripheral shelves 203, 205 shown in FIG. 2B are now described in further detail.

The first type is a regular peripheral shelf (PS), represented as shelf 205. PS 205 contains LCs 220, IOCs 222 and FICs 218. The FICs 218 may be configured either as dual fabric interface cards (DFIC) or quad fabric interface cards (QFIC).

The second type is a high-speed peripheral shelf (HSPS), represented as peripheral shelf 203. HSPS 203 contains high-speed line processing (HSLP) Cards 220', I/O cards 222', high-speed fabric interface cards (HFICs) 218' and two redundant high-speed shelf controller (HSC) cards 224'.

Figure 2C:
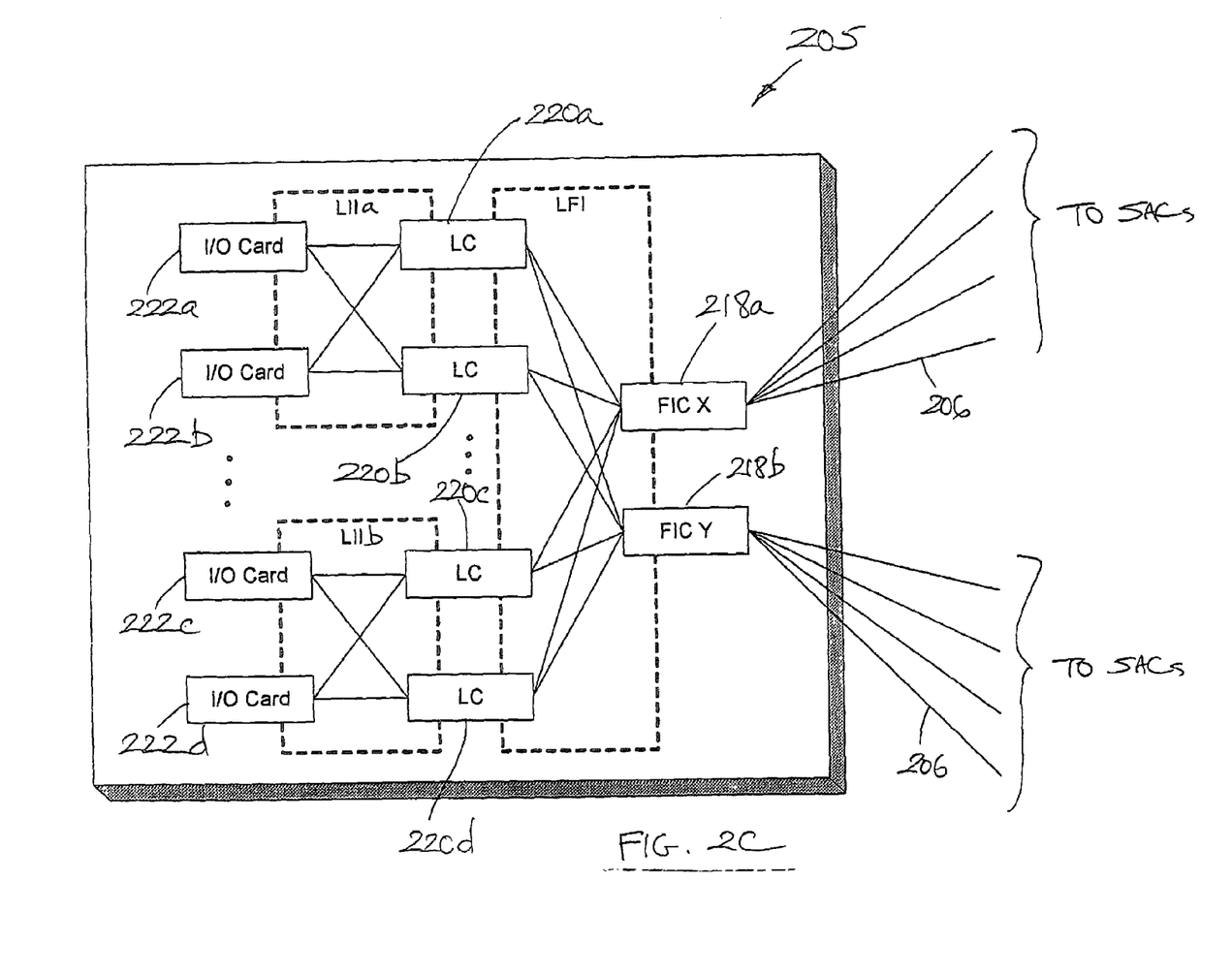
FIG. 2C is a block diagram showing an example of various defined interface groups comprising sets of connected FRUs within a peripheral shelf in FIG. 2B.

Now referring to FIG. 2C, shown is an enlarged view of the peripheral shelf 205 of FIG. 2B. As shown, components or FRUs may be grouped together to define various interface groups. For example, the interface between the LCs 220*a*, 220*b* and IOCs 222*a*, 220*b* is termed a Line Card—IOC Interface (LII) and LCs 220*a*, 220*b* and IOCs 222*a*, 222*b* form the LIIa Group. As shown in FIG. 2C, in Group LIIa, each IOC 222 has a connection to each LC 220, thereby providing a redundant datapath for the traffic processed by LIIa in the event of a failure of one of the IOCs 222 or one of the LCs 220. Analogously, LCs 220*c*, 220*d* and IOCs 222*c*, 222*d* form the LIIb Group and have the same redundant structure. It will be appreciated, however, that an LII Group need not have a redundant configuration as described (e.g. there may be a single LC instead of two).

As another example, the interface between the LCs 220*a*, 220*b*, 220*c*, 220*d* and the FICs 218*a*, 218*b* is termed a Line Card—Fabric Card Interface (LFI) and the LCs 220*a*, 220*b*, 220*c*, 220*d* and the FICs 218*a*, 218*b* form the LFI Group. As with the LII Groups described above, each LC 220 has a link to each FIC 218, thereby providing a redundant datapath for traffic processed by any one component in the LFI Group. However, an LFI Group need not have a redundant configuration as described.

Generally speaking, an interface group can be formed at any interface point between sets of inter-linked components, such as LIIa, LIIb, and LFI shown in FIG. 2C. Notably, LCs 220*a*, 220*b*, 220*c*, 220*d* and IOCs 222*a*, 222*b*, 222*c*, 222*d* collectively do not form an interface group as there is no shared interface between LC 220*a* to IOC 222*c*, for example. However, an interface group comprises at least a first component connected across an interface with a second component, and further connected across the interface with at least a third component.

While a specific FRU configuration is described here by way of example, it will be appreciated that the teachings of the present invention may be extended to virtually any type of FRU configuration capable of being grouped and defined as a part of an interface group as described above. Thus, while three groups are shown by way of example in FIG. 2C, namely the LIIa Group, LIIb Group, and the LFI Group, it will be understood that various other interface groups may be defined for different configurations and different groups of FRUs.

It is also noted that the configuration in FIG. 2C has been simplified for illustrative purposes. In an embodiment, each redundant pair of LCs 220' in an HSPS 203, for example, may connect up to eight IOCs 222' between them. Only two IOCs 222 are shown in FIG. 2C for simplicity. It will be appreciated that the particular layout and configuration of the FRUs will be based on their technical design and connection capabilities and may be different from that shown in FIG. 2C.

Figure 3A:
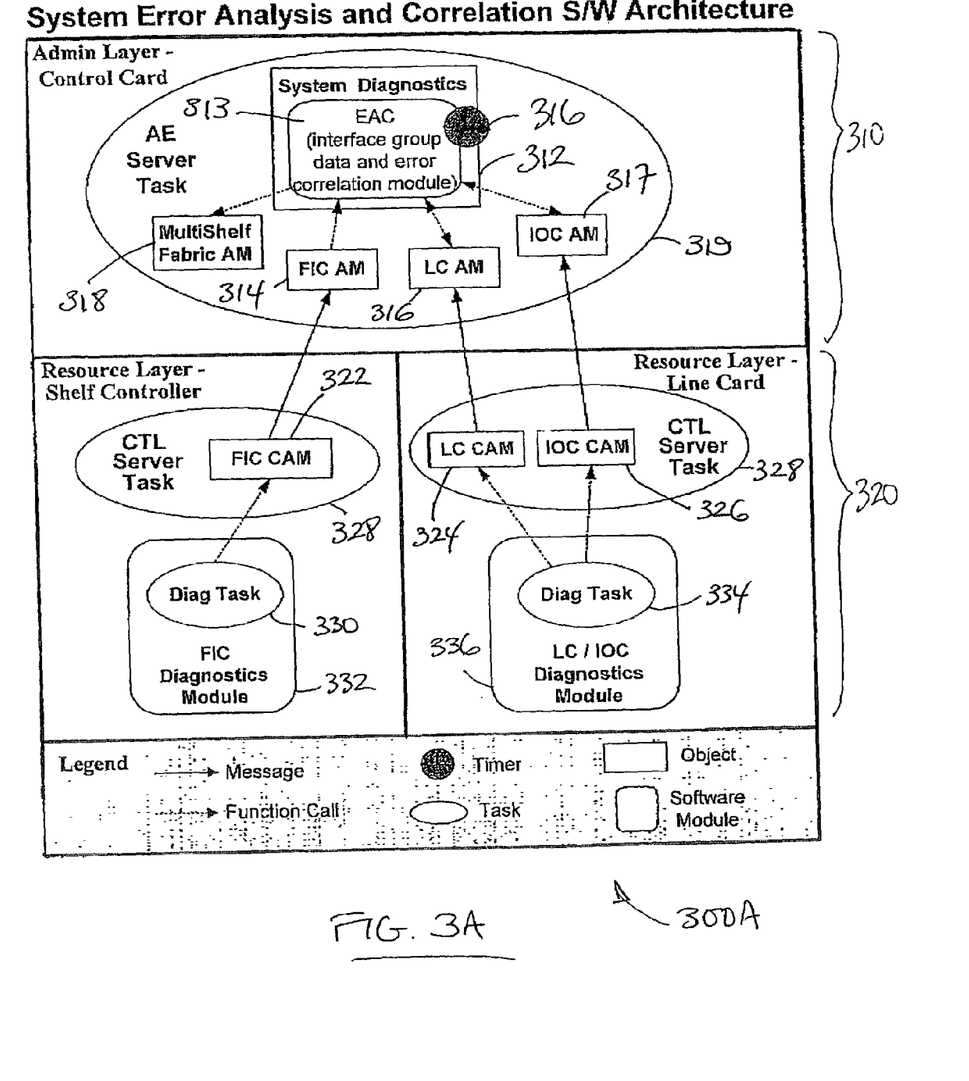
FIG. 3A is a schematic diagram of a diagnostic infrastructure software architecture associated with an error analysis and correction (EAC) method and system in accordance with an embodiment of the present invention, and which may be used to identify faulty components or FRUs within a selected interface group in FIG. 2C.

Now referring to FIG. 3A, shown and generally referred to by reference numeral 300A is a system error analysis and correlation (EAC) in accordance with one embodiment. As will be explained further below, the EAC is particularly suited to analysing and correlating persistent errors that are detected at a component interface, and where the component in isolation is unable to determine whether it is responsible for causing the error, or whether the error was caused by another component connected to that interface.

As shown in FIG. 3A, the diagnostic infrastructure 300A comprises an administrative layer 310, which has knowledge of the entire network element status, and a resource layer 320, which resides on each component or FRU and only has knowledge pertaining to that FRU.

The administrative layer may comprise, for example, software modules operating on control complex 202. The administrative layer 310 receives error status reports from elements in the resource layer 320. These reports are channelled to the System Diagnostics AM 312, which is simply a container object for an EAC software module 313. Thus, the System Diagnostics AM 312 provides the EAC module 313 with an external interface to other AM objects. Based on the error status reports, the EAC module 313 evaluates the health of the monitored elements to identify likely defective components when errors are reported by the elements in the resource layer 320. A timer 316 is accessible by the EAC module 313 for performing the various EAC tasks as described herein.

In an embodiment, the error status updates are messages sent by the resource layer 320 on various FRUs (e.g. on a shelf controller or a line card as shown in FIG. 3A) to the administrative layer 310. At the administrative layer 310, an AE Server Task 319 forwards the messages to the corresponding AM object. In turn, the AM object forwards the relevant error status information to the EAC module 313. In this illustrative example, status reports are received by the EAC 313 from various AM objects including, for example, a FIC AM object 314, a Line Card (LC) AM object 316, and an IOC AM object 317.

In the Resource Layer 320, each Diagnostics Task 330 and 334 monitors for errors detected on the components or FRUs, including errors present at communications interfaces to other FRUs (hence "interface errors"). Interface errors may be uncertain due to the fact that an FRU in isolation may be unable to determine whether it is responsible for causing the error, or whether the error was caused by another FRU at the other side of the interface. If an error is detected or an error is cleared, the Diagnostics Tasks 330 and 334 report this status change to the CAM corresponding to the FRU.

By way of example, a FIC-CAM object 322, a LC CAM object 324, and an IOC CAM object 326 are shown in FIG. 3A. The various CAMs 322, 324, 326 are objects of the CTL Server Task 328 which provide an a message interface point between the Resource Layer 320 and the corresponding AM objects in the Administrative Layer 310.

In an embodiment, the CAMs 322, 324, 326 communicate with the respective access modules 314, 316 and 317 via messaging between the AE Server Task 319 and the CTL Server Tasks 328.

For example, interface errors detected by the LC Diagnostics Task 330 and the FIC Diagnostics Task 334 will be forwarded to the EAC module 313 via the respective AM and CAM objects. If the EAC module 313 determines that a particular FIC 218 is a faulty FRU, the EAC module 313 will inform a Multi-shelf Fabric AM 318 to handle the fault. The Multi-shelf Fabric AM 318 will assign demerits to the appropriate fabric (i.e. fabric 'X' or fabric 'Y' referring to FIGS. 2A . . . 2C), in order to possibly cause a fabric activity switch away from the faulty FIC 218. Otherwise, if an LC 220 or an IOC 222 is at fault, the EAC module 313 may cause demerits to be assigned to the particular LC 220 or IOC 222 through a function call to the appropriate IOC AM object 317 or Line Card AM object 316.

In order to analyse uncertain interface error indications in an interface group of components or FRUs, the EAC module 313 should be kept current about the health of all the involved FRUs at those interfaces. For example LC 220 and IOC 222 status changes and any LC 220 redundancy configuration changes may be reported to the EAC module 313 by their respective AM objects 316, 317. As another example, the FIC Diagnostics Task 334 may report to the EAC module 313 when certain FIC errors are declared or removed. Generally speaking, the EAC module 313 should be capable of analysing and correlating many different types of error indications and status changes.

In the present example, the basis for all EAC module 313 common components are the input functions that are common to all interface groups (e.g. LIIa, LIIb, LFI of FIG. 2C). By way of example, shown in Table A below is a set of function names which may be used by the EAC module 313, and their associated descriptions:

TABLE A

| Function Name | Description |
| --- | --- |
| HandleInterfaceError( ) | Handles interface errors. |
| HandleShelfStatusChange( ) | Handles shelf status change. |
| HandleCardStatusChange( ) | Updates the Interface Group with card status change. |
| HndleCardRedundancyChange( ) | Updates the Interface Group with card redundancy change. |

In an embodiment, EAC 313 contains a static list of function pointers indexed by interface group type (e.g. LFI, LII). For example, each interface group type (e.g. LFI, LII) may have associated with it data stored in an array of function pointers, one pointer for each function listed in Table A, above. If no action is required for a particular interface group in response to a given input, a null function pointer may be provided. The EAC module 313 provides a function that checks the parameters of an input to determine which arrays of functional pointers (each array being associated with an interface group) should be updated. For example, if an uncertain interface error is reported via a FIC AM object 314, the LII HandleInterfaceError( ) function will identify that the interface error does not affect an LII Group and ignore the status update for any LII Groups. However, the LFI HandleInterfaceError( ) function will determine which LFI Group is affected and update its data.

In an embodiment, after EAC receives a change in status information for a given interface group, it must make sure that all relevant information has had a chance to be reported before making a determination of the faulty FRU. Therefore, a predetermined waiting period may be used to receive all relevant information before proceeding with the analysis and correlation.

Figure 3B:
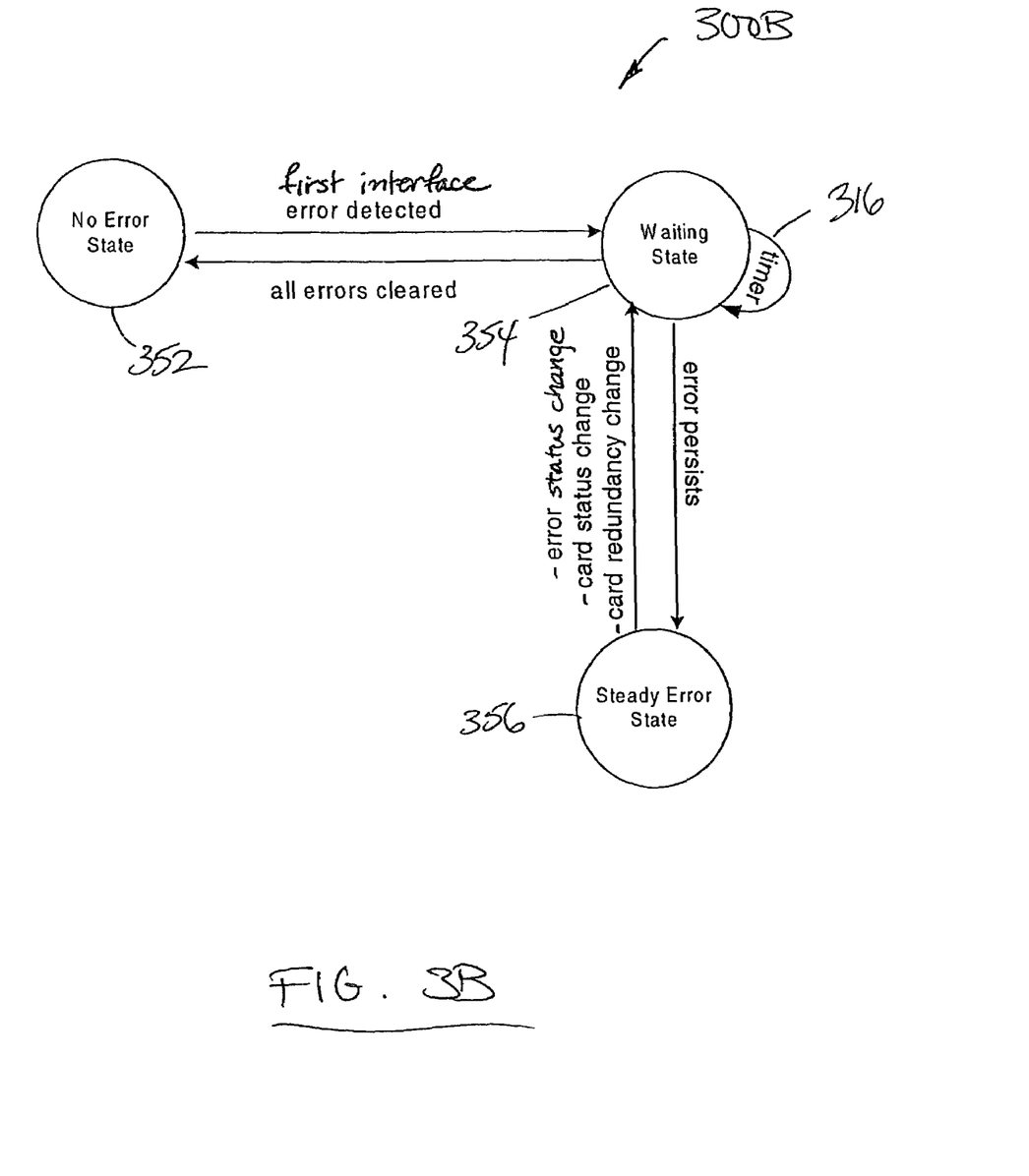
FIG. 3B is a state diagram showing an EAC state machine associated with an interface group being analysed by the EAC module shown in FIG. 3A.

Now referring to FIG. 3B, an EAC interface group state machine (IGSM) for the EAC module 313 of FIG. 3A is shown and generally referred to by reference numeral 300B. As noted, the EAC module 313 collects information from different components or FRUs on each shelf before determining the faulty FRU(s), and this is done through the EAC IGSM. The EAC IGSM is common to all LII and LFI error handling and provides a debounce interval before the EAC module 313 performs error correlation for the interface group. As shown in FIG. 3B, in an embodiment, an EAC IGSM has three states: No Error State 352, Waiting State 354, and Steady Error State 356.

In the present illustrative example, the EAC module 313 may handle errors from the LFI Group, the LIIa Group and the LIIb Group (FIG. 2C). Furthermore, the EAC 313 may support LFI and LII interface groups for different shelf types such as a PS 205 or a HSPS 203. The total number of LFI and LII groups per shelf is based on the shelf type, and there is one EAC IGMS for each interface group. When a shelf is first configured, each EAC IGSM defaults to the No Error State 352 as the initial state. The No Error State 352 indicates that no errors exist on any interfaces. The EAC IGSM stays in this No Error State 352 until an interface error is detected. If there are component status changes or component redundancy changes affecting a given interface group, its data is updated, as described earlier. However, its EAC IGSM remains in the No Error State 352. Upon detection of an interface error, however, the EAC 313 records the error in the interface group's data array, and the EAC IGSM moves into the Waiting State 354.

The Waiting State 354 allows more errors and status changes involving the interface group to be reported to the EAC 313 during a predetermined time period. The duration of the time period may be dependent, for example, on how often errors are reported and how long it takes for messages to be propagated from the resource layer 320 to the administrative layer 310. While in the Waiting State 354, EAC 313 records newly reported errors in the interface group data but does not correlate the data. Upon entering the Waiting State 354, the EAC IGSM starts the timer 316. When the timer 316 expires, the EAC IGSM determines the next state by checking whether there are any outstanding interface errors recorded. If all interface errors are cleared when the timer 316 expires (i.e., the error or fault is not persistent), the EAC IGSM moves back to the No Error State 352 and removes any component or fabric "demerits" that it may have assigned in the past. Otherwise, the EAC IGSM enters the Steady Error State 356 and begins error analysis and correlation in order to determine the faulty FRU.

In the Steady Error State 356, EAC 313 determines the faulty FRU(s) that are responsible for interface errors in accordance with the present embodiment. This determination is based on a correlation of information collected for the interface group, such as component type, component status and redundancy configuration. Once the FRU(s) that should be blamed for the interface errors has/have been determined, the EAC 313 reports the faulty FRUs to the user management interface and assigns or removes demerits accordingly, based on the previous demerit history for that interface group. In the example of a LFI group, demerits may be assigned to a FIC's (FIG. 2C) fabric via the Multi-shelf Fabric AM 318 or to a LC via its LC AM object 316. After that action is taken, the EAC IGSM stays in the Steady Error State 356 until there is a further status change involving its interface group, which causes the EAC IGSM to move back to the Waiting State 354. This status change could be, for example, the addition or removal of an interface error, a component status change (e.g. from OK to Fault state) or a component redundancy configuration change (e.g. from redundant to non-redundant).

For each interface group (FIG. 2C), it will be appreciated that reported errors may be classified by EAC 313 into related categories for correlation. For example, LFI interface errors may be categorised as datapath interface errors, control path interface errors, or connectivity errors. Similarly, LII interface errors may be categorised as datapath interface errors or control path interface errors. Table B presents an example of the interface error categories of each interface group type in the present illustrative embodiment. Errors in separate categories within the same interface group are considered to be orthogonal and may be correlated independently, although the correlation will involve the same card status and redundancy information.

TABLE B

| Error Category | Examples of Uncertain Interface Errors Detected |
| --- | --- |
| LFI Datapath | A parity error detected on the ingress data input of a FIC. |
| | A loss of clock detected on the egress data input of a LC. |
| LFI Control Path | Frame misalignment error detected by the HSPS LC on a back-pressure control frame sent by the FIC. |
| LFI Connectivity | Failure of the cell test diagnostic performed by the LC which periodically bounces a test cell off the fabric. |
| LII Datapath | A cell header check error detected on the ingress data input of a LC. |
| | A cell misalignment error detected on the egress data input of an IOC. |
| LII Control Path | A parity error detected by an IOC on a control frame sent by a LC. |
| | An alignment error detected by a LC on a control frame sent by an IOC. |

In an embodiment, when an EAC IGSM for an LFI or LII Group enters the Steady Error State 356, it performs error analysis and correlation based on the data collected by the EAC module 313 for that interface group. This data includes, for example, the status of all components in the interface group (OK or Faulted/Demerited), whether the LCs in the group are configured for redundancy, and a list of all component interfaces currently experiencing errors in the given category (e.g. datapath, control path).

In an embodiment, the first step of the correlation method is to determine which interface errors may be ignored. Errors on a given interface are ignored when either card connected via that interface has been faulted. When a component or FRU is faulted, the faulty FRU is reported to the user management interface and a redundancy switch may be performed away from the faulty FRU. In this case, there is no need for the EAC module 313 to take further action against the faulty FRU due to the interface error. After examining the status of all components or FRUs in the interface group, the EAC module 313 is left with a list of outstanding interface errors that cannot be attributed to a previously identified faulty component.

For illustration of this embodiment, the error analysis and correlation method for interface errors occurring in an LFI Group in one of its categories will now be described.

LFI Error Analysis and Correlation Method

Figure 4:
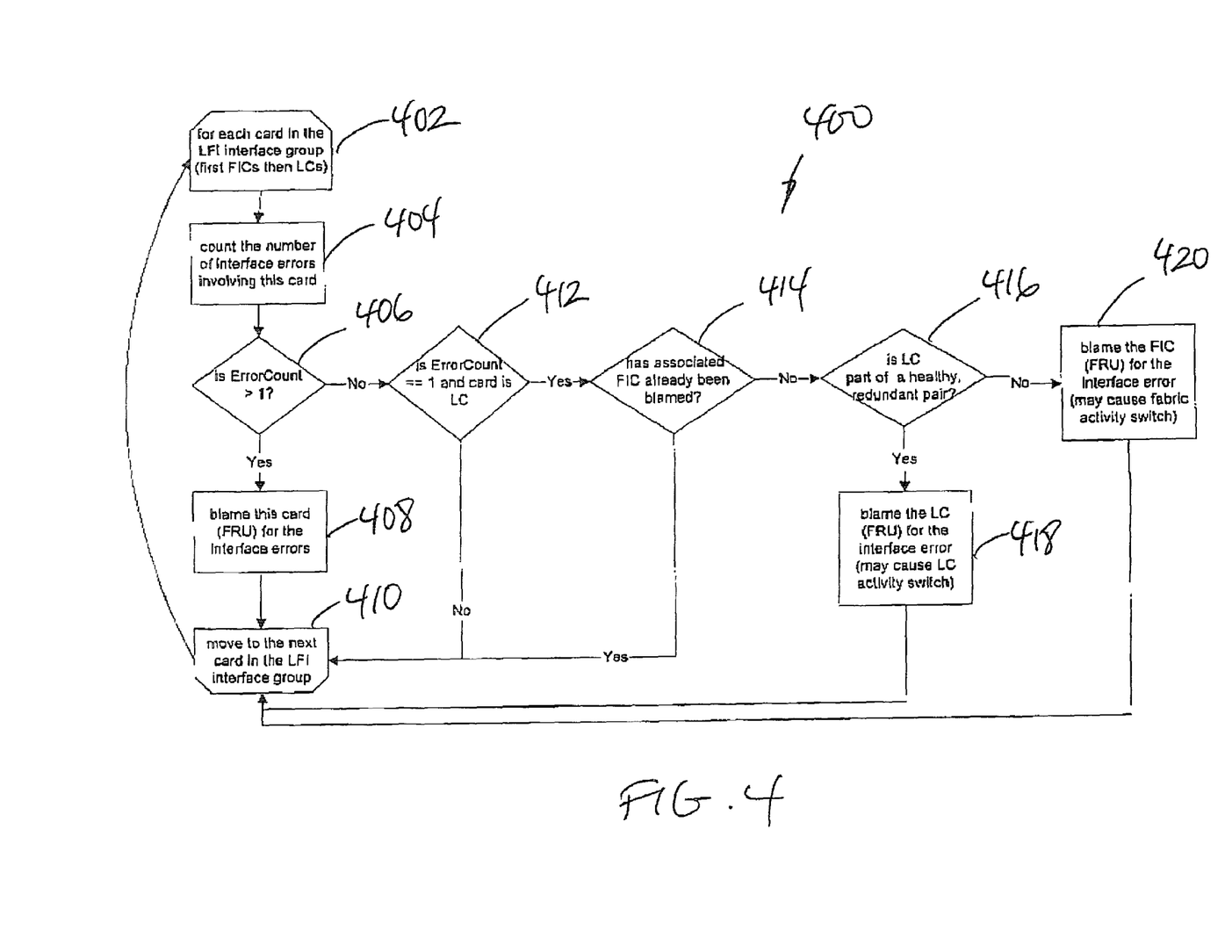
FIG. 4 is a flow chart of an exemplary process illustrating operation of the EAC method and system in accordance with an embodiment, for identifying a faulty FRU within an LFI interface group (defined further below), shown in FIG. 3A.

Now referring to FIG. 4, shown and generally referred to by reference numeral 400 is an illustrative process implementing rules to determine which FRU(s) should be blamed for any outstanding interface errors of an LFI group (FIG. 2C). Process 400 describing an EAC function for LFI interface error correction begins at block 402 and, as shown, loops through each component or card in the LFI group. In an embodiment, the process 400 may begin with the FICs and end with the LCs. It will be appreciated, however, that the process 400 may begin with the LCs instead, in which case references to FICs and LCs in process 400 shown in FIG. 4 would be exchanged.

For each component or card, process 404 counts the number of interface errors that involve the component. If the answer to the query at block 406 (is the error count greater than 1?) is yes, process 400 proceeds to block 408 and blames the component with the multiple errors. If the blamed card is a FIC 218 (FIG. 2C), the EAC module 313 assigns demerits to that FIC's fabric through the Multi-shelf Fabric AM object 318, if it has not already done so according to any earlier demerit history (i.e. the FIC has already been demerited). If the blamed card is a LC, the EAC module 313 demerits that LC through its LC AM object 316, if it has not already done so according to its earlier demerit history.

If the answer to the query at block 406 is no, process 400 proceeds to block 412 at which process 400 queries whether the result of the count at block 404 is equal to 1 and the card type is LC. If the answer is no, process 400 proceeds to block 410 and moves to the next component in the interface group by looping back to block 402. If the answer to the query at block 412 is yes, process 400 proceeds to block 414 and queries whether the FIC connected at the other end of the LC's errored interface has already been blamed for interface errors. If the answer is yes, process 400 proceeds to block 410 and moves to the next component in the interface group by looping back to block 402. If the answer to the query at block 414 is no, process 400 proceeds to block 416 and queries whether the LC is part of a healthy redundant pair (i.e. both LCs of the redundant pair have a status of OK). If the answer is yes, the process in block 418 blames the LC for the single error in order that a fault free active path may be restored through an LC activity switch, instead of switching the entire fabric (and potentially causing greater cell loss). Accordingly, the EAC module 313 assigns demerits to the LC through its LC AM object 316, if it has not already done so according to its demerit history.

If the answer to the query at block 416 is no, the process 400 proceeds to block 420 and blames the associated FIC for the single error, because without LC redundancy a fabric activity switch is required in order to restore a fault free active datapath. Accordingly, the EAC module 313 assigns demerits to the FIC's fabric through the Multi-shelf Fabric AM object 318, if it has not already done so. From block 420, process 400 proceeds to block 410 and loops back to block 402 until all components in the interface group have been analysed and correlated.

While one possible embodiment has been shown and described above, it will be appreciated that other similar processes may be used to analyse and assign blame to a faulty component in the interface group.

Another example is now provided of an error analysis and correlation method for interface errors occurring in an LII Group in one of its categories.

LII Error Analysis and Correlation Method

Figure 5:
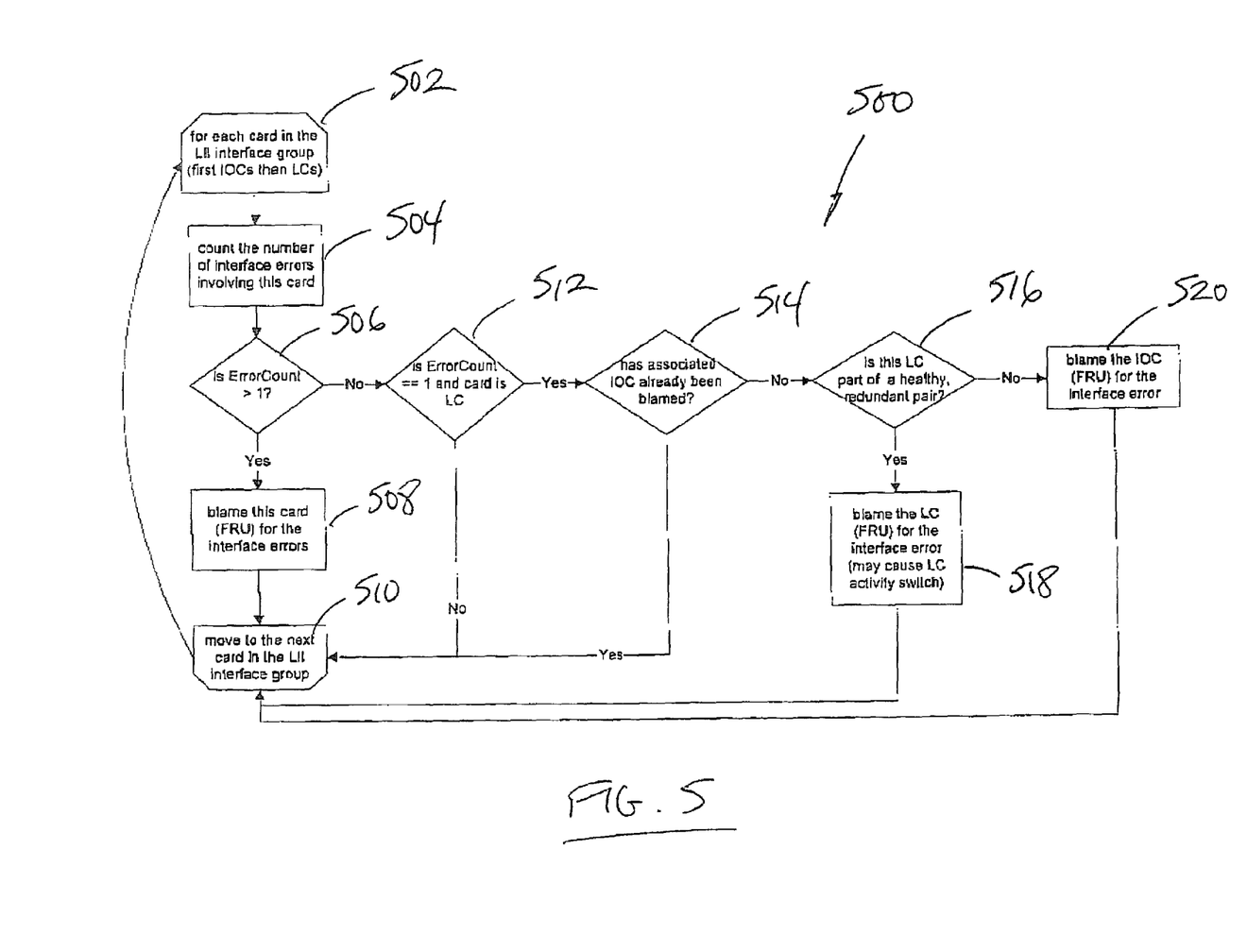
FIG. 5 is a flow chart of an exemplary process illustrating operation of the EAC method and system in accordance with an embodiment, for identifying a faulty FRU within an LII interface group (defined further below), shown in FIG. 2C.

Now referring to FIG. 5, shown and generally referred to by reference numeral 500 is a flow chart of an illustrative process implementing rules to determine which FRU(s) should be blamed for the outstanding interface errors of an LII group (FIG. 2C). Process 500 describing an EAC function for LII interface error correction begins at block 502 and, as shown, loops through each component in the LII group. In an embodiment, the process 500 ,may begin with the IOCs and end with the LCs. Again, it will be appreciated that the process 500 could begin with the LCs, but the references to IOCs and LCs in process 500 shown in FIG. 5 would be exchanged.

At block 504, for each component, process 500 counts the number of interface errors that involve the component. Process 500 then proceeds to block 506, and if the answer to the query (is the error count at block 504 greater than 1?) at block 506 is yes, process 500 proceeds to block 508 and blames the component with the multiple error count as being the faulty FRU. If the blamed FRU is an IOC, the EAC module 313 assigns demerits to that IOC through its IOC AM object 317, if it has not already done so according to its demerit history.

If the answer to the query at block 506 is no, process 500 proceeds to block 512 and queries whether the error count at block 504 is equal to 1 and the card type is LC. If the answer is no, process 500 proceeds to block 510 and moves to the next component in the interface group by looping back to block 502. If the answer to the query at block 506 is yes, process 500 proceeds to block 514 and queries whether the IOC connected at the other end of the LC's errored interface has already been blamed for interface errors. If the answer is yes, process 500 proceeds to block 510 and moves to the next component in the interface group by looping back to block 502. If the answer to the query at block 514 is no, process 500 proceeds to block 516 and queries whether the LC is part of a healthy redundant pair (i.e. both LCs have a status of OK). If the answer is yes, the process 500 moves to block 518 and blames the LC for the single error, in order that a fault free active datapath may be restored through an LC activity switch. Accordingly, the EAC module 313 assigns demerits to the LC through its LC AM object 316, if it has not already done so.

If the answer to the query at block 516 is no, process 500 proceeds to block 520 blames the IOC for the single error. Accordingly, the EAC module 313 assigns demerits to that IOC through its IOC AM object 317, if it has not already done so. From block 520, process 500 proceeds to block 510, and if there are any further components in the interface group, process 500 loops back to block 502.

It is noted that those skilled in the art will appreciate that various modifications of detail may be made to the present embodiment, all of which would come within the scope of the invention. Notably, the processes described and shown above are iterative in nature, going through each component within an interface group in order to collect the error and status data required for analysis and correlation. However, it will be appreciated that such collection of data can be accomplished in any one of a number of ways, including simultaneous collection or parallel collection of data through the use of a number of processes, before analysing the interface group as a whole. Furthermore, it will be appreciated that the rules implemented by the illustrative processes described above with reference to FIGS. 4 and 5 may alternatively be implemented in a tabular or array form, with one or more factor inputs producing a predetermined output.

We claim:

1. A method isolating the source of a fault detected in a group of interconnected components forming part of a communications network carrying data traffic, said method comprising:

(i) monitoring individual components of said group to detect errors in said data traffic;

(ii) reporting errors detected at each of said components to a common error administrator for said group of interconnected components;

(iii) maintaining a record of an error status of said components at said common error administrator; and (iv) performing a rule-based analysis at said common error administrator based on an overall knowledge of the error status of the group of components to correlate error reports collected by said common error administrator so as to isolate the probable source of an error reported to said administrator by any one of said components;

wherein said error administrator classifies reported errors into related categories, and errors in different categories are correlated independently; and wherein said categories are selected from the group consisting of: datapath interface errors, control path interface errors, and connectivity errors.

2. The method of claim 1, wherein said error administrator maintains a record of demerit points for each of said components, and said error administrator assigns or removes demerit points for said components in accordance with the result of step (iv) as part of maintaining the record of the error status of said components.

3. The method of claim 1, wherein in response the receipt of a new error report from a particular component, said error administrator first determines whether said particular component, or another component supplying data traffic to said particular component, has already been identified as faulty, and if so said error administrator ignores said new error report.

4. The method of claim 1, wherein in response to the receipt of a new error report the error administrator enters a wait state for a predetermined period of time, and wherein said rule-based analysis is performed after the expiry of said predetermined period only if errors are still present.

5. The method of claim 1, wherein when a particular component reports a new error, said administrator determines whether said particular component is currently reporting more than one error, and in the event that said particular component is currently reporting more than one error, said error administrator identifies said particular component as the probable the source of the reported new error.

6. The method of claim 5, wherein if said particular component is not reporting more than one error, said error administrator determines whether another component supplying data traffic to said particular component has been identified as faulty, and if said another component has been identified as faulty, said error administrator identifies said another component as the probable source of said error for said particular component.

7. The method of claim 1, wherein said rule-based analysis utilizes component redundancy as a factor in isolating the probable source of the reported new error.

8. The method of claim 1, wherein said errors are detected at interfaces of said components.

9. A method isolating the source of a fault detected in a group of interconnected components forming part of a communications network carrying data traffic, said method comprising:
(i) monitoring interfaces of individual components of said group to detect errors in said data traffic;
(ii) reporting errors detected at each of said components to a common error administrator for said group of interconnected components;
(iii) maintaining a record of an error status of said components at said common error administrator; and
(iv) performing a rule-based analysis at said common error administrator based on an overall knowledge of the error status of the group of components so as to correlate error reports collected by said common error administrator to isolate the probable source of an error reported to said administrator by any one of said components; and
wherein said reported errors are selected from the group consisting of: a parity error; a loss of clock signal; a frame misalignment; a cell header check error; a cell misalignment error; and failure of a cell test diagnostic.

10. A system for isolating the source of a fault detected in a group of interconnected components forming part of a communications network carrying data traffic, said system comprising:
(i) a plurality of monitors for monitoring individual components forming part of said group for errors in said data traffic;
(ii) an error administrator receiving reports of errors detected by said monitors;
(iii) a storage medium for maintaining a record of the error status of said components at said error administrator; and
(iv) wherein said error administrator is configured to perform a rule-based analysis based on an overall knowledge of the error status of the group of components correlating error reports collected by said administrator so as to isolate the probable source of a new error reported to said administrator by any one of said components;
wherein said error administrator is configured to classify reported errors into related categories for correlation, and to correlate independently errors in different categories; and
wherein said categories are selected from the group consisting of: datapath interface errors, control path interface errors, and connectivity errors.

11. The system of claim 10, wherein said error administrator is configured to maintain a record of demerit points for each of said components and to assign or remove demerit points for a said component identified as the probable source of said a said reported error.

12. The system of claim 10, wherein said error administrator is configured, in response to the receipt of a new error report from a particular component, to first determine whether said particular component, or another component supplying communications traffic to said particular component, have already been identified as faulty, and if so to ignore said new error report.

13. The system of claim 10, wherein in response to the receipt of a new error report the error administrator is configured to enter a wait state for a predetermined period of time and perform said rule-based analysis after the expiry of said predetermined period only if errors are still present.

14. The system of claim 10, wherein said error administrator is configured such that when a particular component reports a new error, said error administrator determines whether said particular component is currently reporting more than one error, and in the event that said particular component is currently reporting more than one error, said error administrator identifies said particular component as the probable the source of the reported new error.

15. The system of claim 14, wherein said error administrator is configured such that if said particular component is not reporting more than one error, said error administrator determines whether another component supplying communications traffic to said particular component has been identified as faulty, and if said another component has been identified as faulty, said error administrator identifies said another component as the source of said error for said particular component.

16. The system of claim 10, wherein said rule-based analysis utilizes component redundancy as a factor in isolating the probable source of the reported new error.

* * * * *